(12) United States Patent
Abraham

(10) Patent No.: US 9,285,216 B2
(45) Date of Patent: Mar. 15, 2016

(54) METHOD AND DEVICE FOR DETERMINING AN AXLE GEOMETRY OF A VEHICLE

(75) Inventor: Steffen Abraham, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 659 days.

(21) Appl. No.: 13/641,856

(22) PCT Filed: May 6, 2011

(86) PCT No.: PCT/EP2011/057301
§ 371 (c)(1),
(2), (4) Date: Dec. 26, 2012

(87) PCT Pub. No.: WO2011/144467
PCT Pub. Date: Nov. 24, 2011

(65) Prior Publication Data
US 2013/0116969 A1    May 9, 2013

(30) Foreign Application Priority Data
May 18, 2010    (DE) .......................... 10 2010 029 058

(51) Int. Cl.
*G01C 1/00*    (2006.01)
*G01B 21/26*    (2006.01)

(52) U.S. Cl.
CPC    *G01C 1/00* (2013.01); *G01B 21/26* (2013.01); *G01B 2210/26* (2013.01)

(58) Field of Classification Search
CPC ............... G01B 21/26; G01B 2210/26; G01B 11/2755; G01B 2210/146; G01B 2210/20; G01B 2210/28; G01B 2210/286; G01C 1/00

USPC ........ 702/33, 94, 95, 150, 151; 382/154, 285; 700/279, 280
See application file for complete search history.

(56) References Cited

U.S. PATENT DOCUMENTS

| | | | |
|---|---|---|---|
| 5,014,227 A | 5/1991 | Kling et al. | |
| 5,218,556 A | 6/1993 | Dale, Jr. et al. | |
| 2010/0303336 A1* | 12/2010 | Abraham et al. | ............ 382/154 |

FOREIGN PATENT DOCUMENTS

| | | |
|---|---|---|
| DE | 197 57 763 | 7/1999 |
| EP | 1 042 643 | 10/2000 |
| EP | 1 739 390 | 1/2007 |

(Continued)

OTHER PUBLICATIONS

Daniel B. January, Hunter Engineering Co., Bridgeton, MO, USA : "Steering Geometry and Caster Measurement", SAE Technical Paper Series No. 850219, 1985, pp. 1-10, XP008068693 Warrendale, PA, USA.

*Primary Examiner* — John H Le
(74) *Attorney, Agent, or Firm* — Kenyon & Kenyon LLP

(57) ABSTRACT

A method for determining characteristics of an axle geometry of a vehicle including the following: steering a wheel mounted on an axle of the vehicle to various steering positions having different steering angles; determining the spatial position of the wheel at the different steering positions; determining the particular axis of rotation of the wheel in the different steering positions from the results of the determination of the spatial position; modeling a parametric model of the steering axis; adapting the parametric model of the steering axis to the axes of rotation of the wheel determined from the measurement of the spatial position; and determining characteristics of the axle geometry from the adapted parametric model of the steering axis.

10 Claims, 5 Drawing Sheets

(56) References Cited

FOREIGN PATENT DOCUMENTS

| | | |
|---|---|---|
| EP | 187 51 64 | 1/2008 |
| WO | 2006/130694 | 12/2006 |
| WO | 2008/046715 | 4/2008 |

* cited by examiner

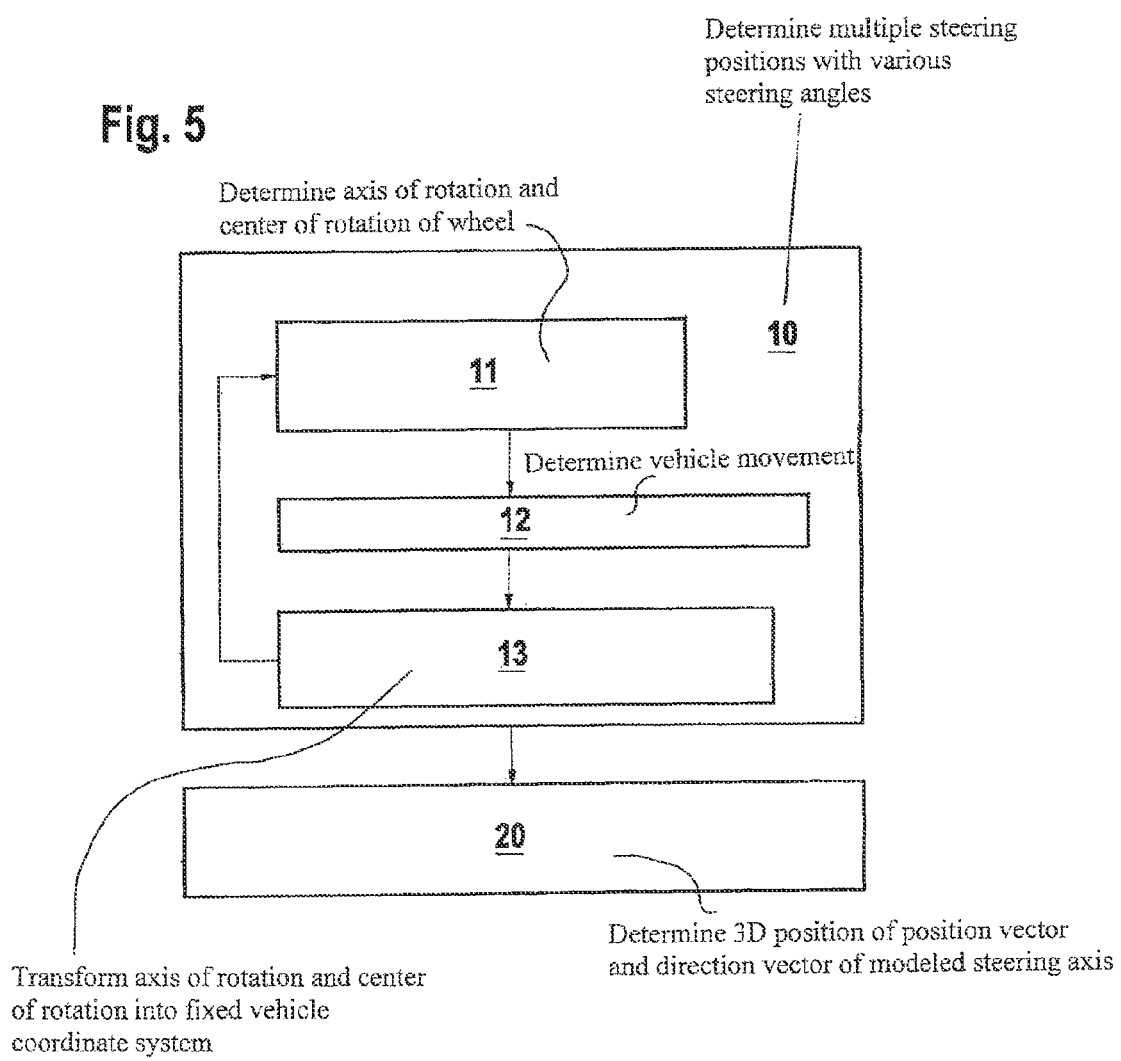

METHOD AND DEVICE FOR DETERMINING AN AXLE GEOMETRY OF A VEHICLE

FIELD OF THE INVENTION

The present invention relates to a method and a device for determining an axle geometry of a vehicle. The present invention relates in particular to the checking and measuring of the steering geometry during axle alignment, concretely to the 3D determination of the steering axis using the characteristics of spread angle, caster angle, caster offset, and kingpin offset.

BACKGROUND INFORMATION

During axle alignment, the toe and camber angles of the vehicle are determined and set as necessary. An additional subtask of axle alignment is to check the steering geometry. This is carried out by measuring the movement of a wheel during a steering movement. The spread angle and the caster angle are typically measured in this process.

The characteristics of the steering geometry depend on the mechanical configuration of the steering. A differentiation is made between classic geometries having a fixed steering axis and so-called multilink suspensions. Characteristics for describing the steering geometry with a fixed steering axis, such as spread angle, caster angle, caster offset, and kingpin offset, are defined in DIN 70000.

To determine the characteristics, the toe angle and the camber angle are typically measured during a steering movement ("steering wheel turn routine"). The variables spread angle and caster angle are then calculated from the toe and camber values of the wheel at different steering angles.

In "HUNTER ENGINEERING CO, BRIDGETON, Mo., USA: "STEERING GEOMETRY AND CASTER MEASUREMENT", SAE TECHNICAL PAPER SERIES, no. 850219, 1985, pages 1-10, XP008068693 WARRENDALE, Pa., USA", Daniel B. January discusses the calculation of the spread angle and the caster angle from two individual measurements carried out during a wheel steering movement. Since only two individual measurements are carried out, measurement errors in the two toe and camber measurements result in correspondingly significant errors in the steering geometry calculation.

Patent document EP 1 739 390 B1 discusses the linking of more than two toe and camber measurements to increase the measurement accuracy by fitting a polynomial to the measurement curves of the toe and camber angles.

The toe and camber measurement may be carried out using different known axle alignment methods. Newer axle alignment methods allow optical measurement of the axle geometry via 3D recording of the wheel movement. In these methods, the geometric 3D position and alignment of the axis of rotation and the center of rotation of the wheels are determined. This may be carried out by measuring so-called targets with optical target marks on the wheel (refer, for example, to DE 197 57 763 A1, EP 1 042 643 B1) or via three-dimensional recording of the surface of the wheel, e.g., by projecting a pattern onto the wheel surface (refer, for example, to EP 187 51 64 B1, WO 2008/046715 A1).

SUMMARY OF THE INVENTION

An object of the exemplary embodiments and/or exemplary methods of the present invention is to provide a method for determining the axle geometry simply and with a high degree of accuracy.

This objective may be achieved by a method and/or a device according to the descriptions and Figures herein. The further descriptions and Figures herein describe advantageous embodiments of the method according to the present invention.

An aspect of the exemplary embodiments and/or exemplary methods of the present invention is the 3D calculation of the parameters of the steering axis from the axis of rotation and the center of rotation of the wheel in the case of different steering angles using a kinematic model of the steering geometry, the axis of rotation and the center of rotation of the wheel being determined via a 3D measurement of the wheel position, e.g., by measuring optical targets on the wheel or using a 3D surface model of the wheel.

An optical measurement of the 3D axle geometry allows 3D recording of the wheel movement during the entire measuring operation. For steering angle measurement, this means that the 3D position of the center of rotation of the wheel and the 3D direction vector of the wheel axis of rotation are known at every moment of the measurement. According to the exemplary embodiments and/or exemplary methods of the present invention, these measured variables are used for the 3D calculation of the steering axis.

In particular, a method of the present invention for determining an axle geometry of a vehicle includes steering a wheel mounted on an axle of the vehicle to multiple steering positions having various steering angles and measuring the spatial position of the wheel in the various steering positions. The particular axis of rotation of the wheel is determined from the results of the measurement of the spatial position of the wheel in the various steering positions. The parameters of a parametric model of the steering axis are adapted in such a way that the axes of rotation of the wheel determined from the measurement of the spatial position match the axes of rotation calculated from the parametric model to the greatest extent possible. Characteristics of the axle geometry are then calculated from the thus adapted parametric model of the steering axis.

The thus determinable characteristics of the axle geometry include in particular the spread angle and the caster angle.

The method according to the present invention advantageously also includes the determination of the particular center of rotation of the wheel in the various steering positions and the parametric model of the steering axis also includes the center of rotation of the wheel. In this case the caster offset and kingpin offset may be determined from the parametric model in addition to the spread angle and the caster angle.

Using such a method, the four characteristics of the steering axis are determinable during axle alignment by direct calculation of the parameters of the steering axis without the previously customary step of determining the toe and camber values.

Complete modeling of the 3D movement geometry makes it possible to determine the parameters of the steering axis with a high degree of accuracy.

In one specific embodiment of the method according to the present invention, the parametric model of the steering axis is adapted to the axes of rotation determined from the 3D measurement using the method of least squares. The method of least squares is a reliable and easy to implement method for adapting the parametric model of the steering axis to the measured values.

In one specific embodiment, the measurement of the spatial position of the wheel includes the optical recording and evaluation of at least one surface of the wheel. The optical recording and evaluation of at least one surface of the wheel, as in EP 187 51 64 B1 and WO 2008/046715 A1, for example, make it possible to simply and precisely determine the spatial position of the wheel.

In one specific embodiment, the method includes the transformation of the results of 3D measurement into a fixed vehicle coordinate system. For this purpose, the movement of the vehicle is determined, for example, via continuous measurement of the center of rotation and/or the rotation vector of at least one wheel mounted on a non-steered axle of the vehicle.

Vehicle movements occurring during the measuring operation are compensated by the transformation into a fixed vehicle coordinate system. As a result, the measurement may also be carried out with a high degree of accuracy even if the vehicle moves during the measuring operation. The reliability of the measuring operation is increased and implementation is simplified.

In one specific embodiment, the steering of the wheel includes only a small differential deflection from the straight-ahead position, in particular a deflection of no more than 5°. In the case of a differential deflection, the axle geometry of vehicles having a so-called multilink suspension may also be reliably determined. In particular, the geometric variables of the momentary screw axis may be determined and the 3D variables of the steering axis may be derived therefrom.

In one specific embodiment, the steering arm at the wheel center and the steering arm on the roadway plane are determined instead of the kingpin offset. As a result, additional steering geometry parameters may be determined.

In one specific embodiment the method includes the comparison of the measured actual wheel movement with a stored setpoint wheel movement. As a result, the quality of the axle geometry of the vehicle may be determined. In particular, axle geometry distortions, as caused, for example, by accident damage to the vehicle, may be detected and evaluated.

The actual values may be stored, for example, in the form of a table in a memory. Intermediate values not present in the table may be additionally calculated via interpolation.

In one specific embodiment, the stored setpoint wheel movement is a function of the steering angle and/or of the spring deflection condition of the vehicle. This allows a particularly exact comparison of the actual wheel movement with the stored setpoint movement. In particular, errors in the evaluation of the axle geometry caused by different steering angles and/or spring deflection conditions of the vehicle are reliably prevented.

In one specific embodiment, the parametric model also includes geometric modeling of the kinematic chain of the wheel suspension, which is made up of articulated joints, support rods, A-arms, or trapezoidal links, for example. This makes it possible to determine and/or check selected movement parameters of the steering geometry.

An exemplary embodiment of the present invention is elucidated in greater detail below on the basis of the appended figures.

BRIEF DESCRIPTION OF THE DRAWINGS

FIG. 5 schematically shows the sequence of the method according to the present invention.

DETAILED DESCRIPTION

Figure 1:
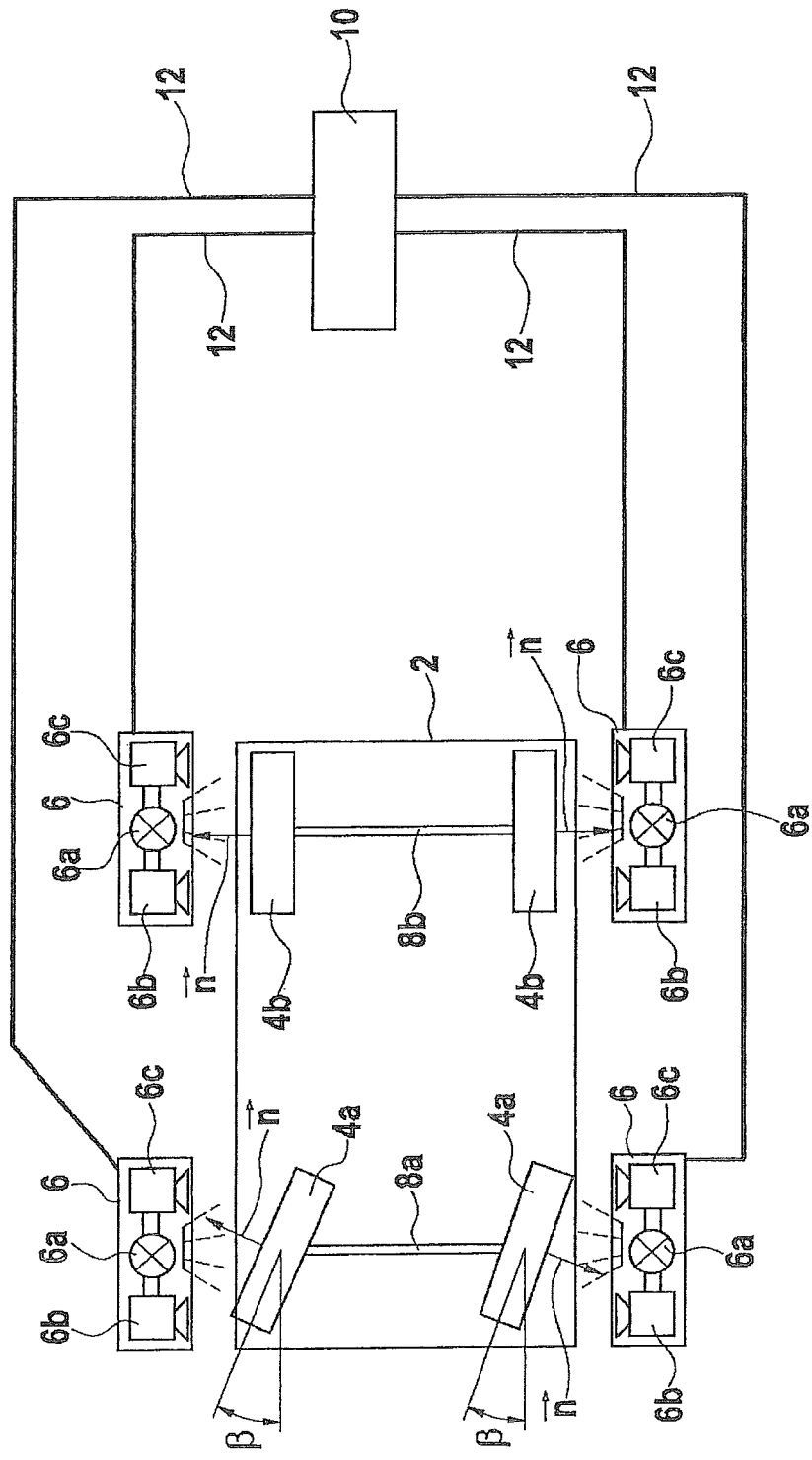
FIG. 1 shows a schematic view of a measuring station for carrying out a wheel alignment.

FIG. 1 shows a schematic top view of a measuring station suitable for implementing a wheel alignment according to the present invention, including a vehicle 2 to be aligned situated on the measuring station.

Vehicle 2 has two axles 8a, 8b, a front axle 8a and a rear axle 8b, situated in parallel to one another at a right angle to the longitudinal extension of vehicle 2.

Wheels 4a, 4b of vehicle 2 are mounted on both ends of axles 8a and 8b, respectively. Wheels 4a on front axle 8a are steerable, and wheels 4b on rear axle 8b are fixed. In FIG. 1 wheels 4a, which are mounted on front axle 8a of vehicle 2, are deflected by a steering angle $\beta$ from the straight-ahead position.

On the side of vehicle 2, a measuring head 6 is situated opposite each of wheels 4a, 4b. Each of four measuring heads 6 has a lighting device 6a, which is set up to illuminate wheel 4a, 4b of vehicle 2 opposite respective measuring head 6. Lighting devices 6a may be configured in such a way that they illuminate wheel 4a, 4b either homogeneously or with a structured light pattern. In particular, each lighting device 6a may have a laser and be configured in such a way that it generates a structured laser light pattern and projects it onto wheel 4a, 4b opposite respective measuring head 6.

In addition to lighting device 6a, each measuring head 6 has a stereo recording device 6b, 6c, each of which has two cameras 6b, 6c in the exemplary embodiment shown in FIG. 1, the cameras being offset from one another on the two sides of particular lighting device 6a within measuring head 6 and aligned with respect to wheel 4a, 4b of vehicle 2 opposite particular measuring head 6. Each measuring head 6 provides a stereo image of wheel 4a, 4b opposite the measuring head.

Measuring heads 6 are connected via electrical lines 12 to an evaluation unit 10, which evaluates the stereo images provided by measuring heads 6 to determine the axle geometry of vehicle 2.

In a simplified specific embodiment not shown in the figures, the measuring station is equipped with fewer than four measuring heads 6. In particular, it is possible to provide only two measuring heads 6 situated on opposite sides of vehicle 2. In this case the axle alignment for both axles 8a, 8b is to be carried out in two separate consecutive steps.

Figure 2:
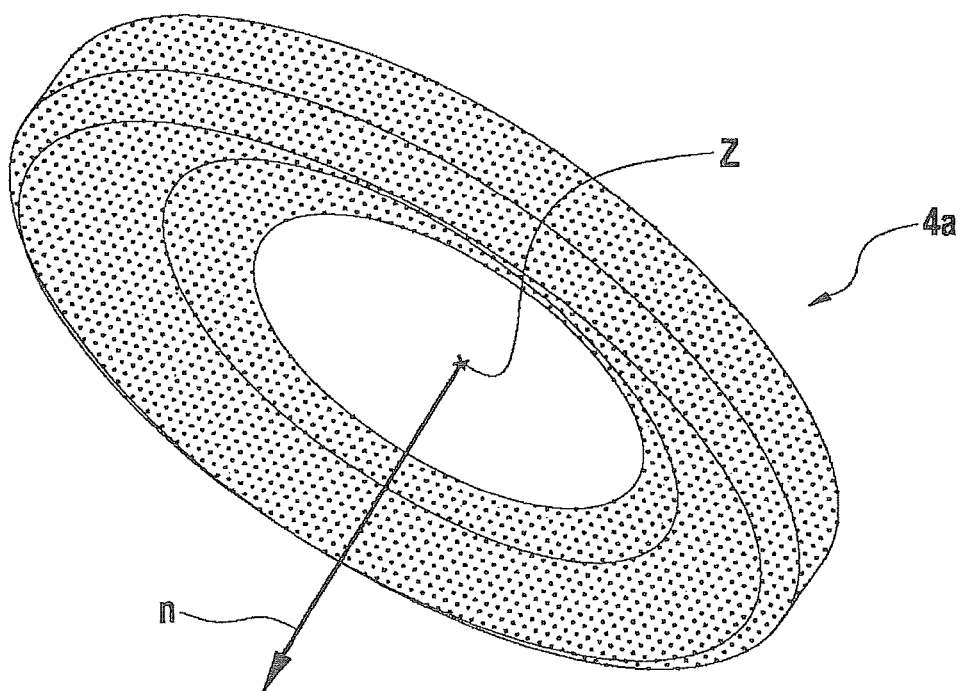
FIG. 2 shows a schematic view of a 3D measuring point cloud of a wheel having an axis of rotation of the wheel calculated from a 3D surface model of the wheel.

FIG. 2 schematically shows a 3D measuring point cloud of a wheel 4a as calculated from a stereo image recorded by one of measuring heads 6. The details of the determination of a 3D measuring point cloud from a stereo image are described in EP 1 875 164 B1, for example. The calculation of the axis of rotation from a 3D measuring point cloud using a parametric surface model of the wheel is described in WO 2008/046715.

FIG. 2 also shows direction vector n (vectors are shown in bold-face type in the following) of the axis of rotation of wheel 4a, as being determinable from a parametric model of wheel 4a, which was adapted to the 3D measuring point cloud as described in WO 2008/046715.

Center of rotation Z of wheel 4a shown in FIG. 2 is also determinable from the parametric model.

Figure 3:
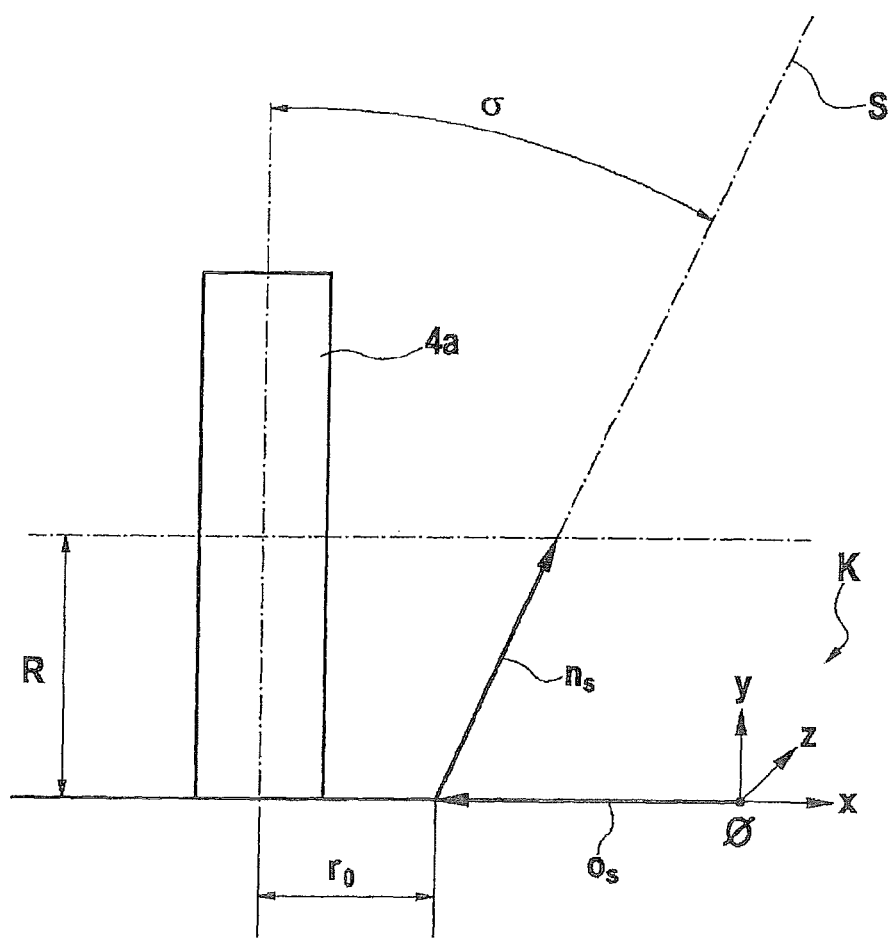
FIG. 3 shows a schematic front view of a wheel having selected characteristics of the steering geometry.

FIG. 3 shows a schematic front view of a wheel 4a having a wheel radius R and a steering axis S. FIG. 3 also shows kingpin offset $r_o$, spread angle $\sigma$, position vector with respect to steering axis $o_s$, which points from origin $\varnothing$ of fixed vehicle coordinate system K to steering axis S, and direction vector $n_s$, which indicates the direction of steering axis S.

Figure 4:
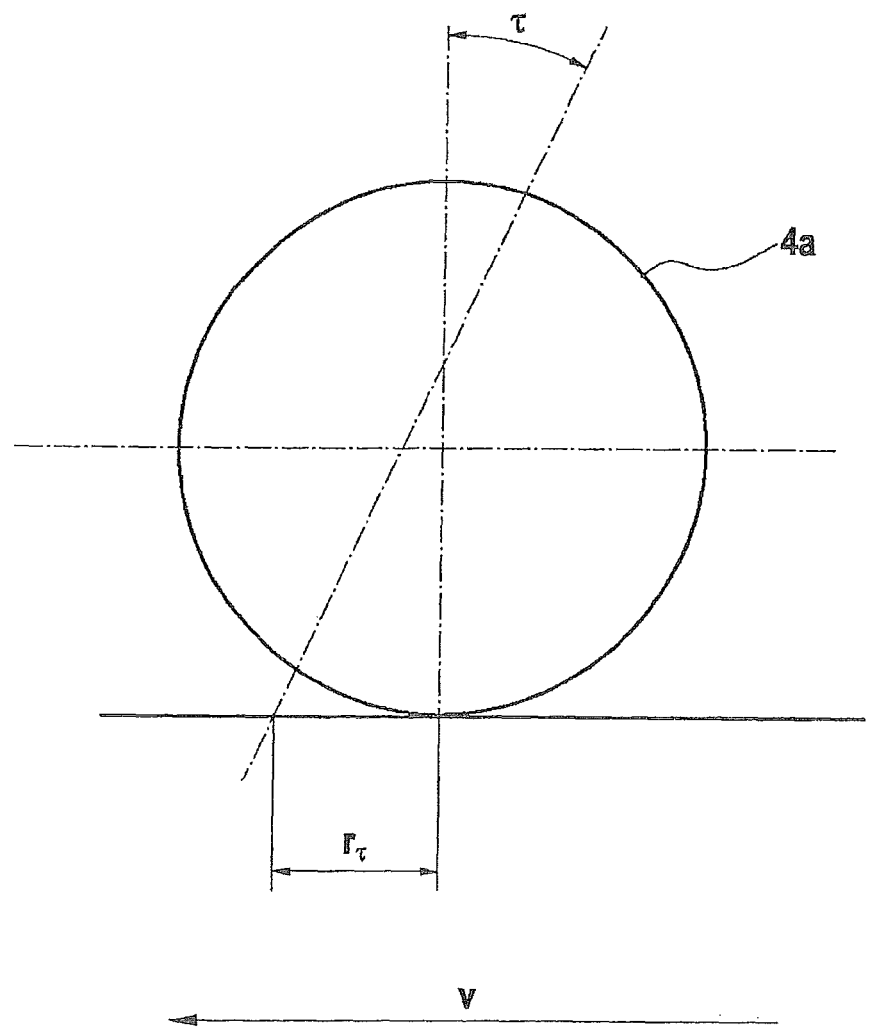
FIG. 4 shows a schematic side view of a wheel having selected additional characteristics of the steering geometry.

FIG. 4 shows a schematic side view of wheel 4a, which is provided in the shown representation for movement along driving direction v from right to left, caster angle τ and caster offset $r_\tau$ being shown.

FIG. 5 schematically shows the sequence of the method according to the present invention.

The position of wheel 4a for multiple steering positions with various steering angles $\beta_i$ is initially measured (step 10).

For this purpose, wheel 4a is turned to steering angle $\beta_i$, at least one stereo image of wheel 4a is recorded for particular steering angle $\beta_i$, and a 3D measuring point cloud is calculated from the stereo image. Axis of rotation $n_i$ and center of rotation $Z_i$ of wheel 4a are determined by adapting a parametric surface model to the 3D measuring point cloud (step 11).

In an alternative method, images of target marks (targets) attached to wheel 4a are recorded, the positions of the target marks are determined, and axis of rotation $n_i$ and center of rotation $Z_i$ of wheel 4a are calculated from the positions of the target marks.

Any movement of vehicle 2 continues to be determined (step 12), and axis of rotation $n_i$ and center of rotation $Z_i$ determined in step 11 are transformed into a fixed vehicle coordinate system K (step 13).

These method steps are repeated for m different steering angles $\beta_i$ of wheel 4a.

m 3D coordinates $x_{Ki}$ of center of rotation $Z_i$ of wheel 4a and m 3D direction vectors $n_{Ki}$ of the axis of rotation of wheel 4a are available as results in a Euclidian fixed vehicle coordinate system K for m different steering angles $\beta_i$ at the particular steering angle.

The kinematic modeling of steering angle S with a position vector $o_s$ and a direction vector $n_s$ $$x_{Ki}=R[\beta_i,n_s]x_D+(I-R[\beta_i,n_s])o_s=f_x[\beta_i,n_s,o_s,x_D]$$

$$n_{Ki}R[\beta_i,n_s]n_D=f_x[\beta_i,n_s,o_s,n_D]$$

describes the movement of 3D center of rotation $x_D$ and 3D rotation vector $n_D$ as a function of steering angle $\beta_i$ at every point in time i (i=1 . . . m) of the steering operation. Steering axis S corresponds to a spatial axis of rotation.

Vector $o_s$ is the 3D position vector to a point on steering axis S and is defined in vehicle coordinate system K. Vector $n_s=[n_x, n_y, n_z]^T$ is the 3D direction vector of steering axis S (see FIG. 3).

Steering angle $\beta_i$ of wheel 4a around steering axis S results in a 3×3 rotation matrix R, which is representable according to the Rodrigues formula, refer, for example, to Murray, R. M.; Li, Z.; and Sastry, S. S., A Mathematical Introduction to Robotic Manipulation, FL: CRC Press, 1994:

$$R = [\cos\beta I + \sin\beta N_x + (1-\cos\beta)n_S n_S^T]$$

$$= \cos\beta \begin{bmatrix} 1 & 0 & 0 \\ 0 & 1 & 0 \\ 0 & 0 & 1 \end{bmatrix} + \sin\beta \begin{bmatrix} 0 & -n_z & n_y \\ n_z & 0 & -n_x \\ -n_y & n_x & 0 \end{bmatrix} + (1-\cos\beta) \begin{bmatrix} n_x \\ n_y \\ n_z \end{bmatrix} [n_x\ n_y\ n_z]$$

In the case of suitable definition of the position of vehicle coordinate system K on the roadway plane, 3D direction vector $n_s$ of steering axis S may be parameterized advantageously via the sought geometric angles: caster angle i and spread angle σ.

3D direction vector $n_s$ is for the left side:

$$n_{SL} = \begin{bmatrix} -\tan\tau \\ -\tan\sigma \\ 1 \end{bmatrix}$$

and for the right side:

$$n_{SR} = \begin{bmatrix} -\tan\tau \\ \tan\sigma \\ 1 \end{bmatrix}$$

By combining the present measurements of center of rotation $x_{Ki}$ and axis of rotation $n_{Ki}$ with the described modeling of steering axis S, known methods, such as the method of least squares $$\sum_i \|\vec{x}_{Ki} - f_x(\beta_i, \vec{n}_S, \vec{o}_S, \vec{x}_D)\|_2 + \sum_i \|\vec{n}_{Ki} - f_n(\beta_i, \vec{n}_S, \vec{o}_S, \vec{n}_D)\|_2 \to \min$$

are used in step 20 to determine the 3D position of position vector $n_s$ and direction vector $o_s$ of a modeled steering axis S, having the best agreement with the measured values. This may be carried out iteratively, for example via linearization of the equations. The characteristics spread angle σ, caster angle τ, kingpin offset $r_0$ and caster offset $r_\tau$ are determinable via geometric calculations from thus optimized parametric model $f(\beta_i,n_s,o_s,n_D)$ of steering axis S.

If only measured axes of rotation $n_{Ki}$ and not centers of rotation $x_{Ki}$ of wheel 4a are used to calculate the axle geometry, it is only possible to determine spread angle σ and caster angle τ, the determination of caster offset $r_\tau$ and kingpin offset $r_0$ being dispensed with:

$$\sum_i \|\vec{n}_{Ki} - f_n(\beta_i, \vec{n}_S, \vec{o}_S, \vec{n}_D)\|_2 \to \min$$

This provides a simplified method which is preferably used when the determination of caster offset $r_\tau$ and kingpin offset $r_0$ may be dispensed with.

What is claimed is:

1. A method for determining characteristics of an axle geometry of a vehicle as part of an axle alignment procedure, the method comprising:
    steering a wheel mounted on an axle of the vehicle to various steering positions having different steering angles;
    determining, by a spatial position determining unit, a spatial position of the wheel in the different steering positions;
    determining, by an evaluation unit including a processor, an axis of rotation of the wheel in the particular steering position from the results of the determination of the spatial position;
    modeling, by the evaluation unit, a parametric model of the steering axis;

determining, by the evaluation unit, the axis of rotation of the wheel from the parametric model of the steering axis for the different steering positions;

adapting, by the evaluation unit, the parametric model of the steering axis to the axes of rotation determined from the measurement of the spatial position of the wheel in the different steering positions; and determining, by the evaluation unit, characteristics of the axle geometry from the adapted parametric model of the steering axis, for the axle alignment.

2. The method of claim 1, wherein the characteristics determined from the adapted parametric model of the steering axis include at least one of the spread angle and a caster angle.

3. The method of claim 1, further comprising:

determining a particular center of rotation of the wheel in the different steering positions, the parametric model of the steering axis including the center of rotation of the wheel; and determining at least one of a caster offset and a kingpin offset from the adapted parametric model of the steering axis.

4. The method of claim 1, wherein the determination of the spatial position of the wheel includes the optical recording and evaluation of optical target marks on the wheel or on at least one surface of the wheel.

5. The method of claim 1, wherein the method includes the transformation of the results of the determination of the spatial position of the wheel into a fixed vehicle coordinate system.

6. The method of claim 1, wherein the steering of the wheel only includes a small deflection from the straight-ahead position that does not exceed a steering angle of 5°.

7. The method of claim 1, wherein the steering arm is determined at the wheel center or the steering arm is determined on the roadway plane.

8. The method of claim 1, wherein the method includes comparing the measured actual movement of the wheel to a stored setpoint movement of the wheel.

9. The method of claim 1, wherein the parametric model of the steering axis includes geometric modeling of the kinematic chain of the steering.

10. A device for determining characteristics of an axle geometry of a vehicle as part of an axle alignment procedure, comprising:

a spatial position determining unit configured to determine, where a wheel mounted on an axle of the vehicle is steered to various steering positions having different steering angles, a spatial position of the wheel in the different steering positions; and an evaluation unit including a processor configured to perform the following:

determine an axis of rotation of the wheel in the particular steering position from the results of the determination of the spatial position;

provide a parametric model of the steering axis;

determine the axis of rotation of the wheel from the parametric model of the steering axis for the different steering positions;

adapt the parametric model of the steering axis to the axes of rotation determined from the measurement of the spatial position of the wheel in the different steering positions; and determine characteristics of the axle geometry from the adapted parametric model of the steering axis, for the axle alignment.

* * * * *